US009756150B2

(12) United States Patent
Wentink

(10) Patent No.: US 9,756,150 B2
(45) Date of Patent: Sep. 5, 2017

(54) SYSTEMS AND METHODS FOR IMPROVED COMMUNICATION EFFICIENCY IN HIGH EFFICIENCY WIRELESS NETWORKS

(71) Applicant: QUALCOMM Incorporated, San Diego, CA (US)

(72) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 14/538,658

(22) Filed: Nov. 11, 2014

(65) Prior Publication Data
US 2015/0131627 A1 May 14, 2015

Related U.S. Application Data

(60) Provisional application No. 61/904,374, filed on Nov. 14, 2013.

(51) Int. Cl.
*H04L 29/06* (2006.01)
*H04W 74/08* (2009.01)
(Continued)

(52) U.S. Cl.
CPC ............ *H04L 69/18* (2013.01); *H04L 47/135* (2013.01); *H04L 67/04* (2013.01); *H04L 67/18* (2013.01);
(Continued)

(58) Field of Classification Search
CPC ....... H04L 69/18; H04L 47/135; H04L 67/04; H04L 67/18; H04W 74/0816
See application file for complete search history.

(56) References Cited

U.S. PATENT DOCUMENTS 6,680,911 B1 1/2004 Kim
7,257,125 B1 8/2007 Pannell
(Continued)

FOREIGN PATENT DOCUMENTS

WO WO-2005018180 2/2005

OTHER PUBLICATIONS

Cheong Minho, et al., "HEW Functional Requirements Follow-up (Preliminary Version for Study Group Discussions) Date: Jul. 15, 2013 Authors and Contributors Name Company Address Phone", Jul. 15, 2013 (Jul. 15, 2013), XP055168013, pp. 1-8, Retrieved from the Internet: URL:https://mentor.ieee.org/802.11/dcn/13/11-13-0840-01-0hew-hew-functional-requirements-follow-up.doc [retrieved on Feb. 6, 2015].
(Continued)

*Primary Examiner* — Benjamin H Elliott, IV
*Assistant Examiner* — Kevin Lee
(74) *Attorney, Agent, or Firm* — Knobbe, Martens, Olson & Bear, LLP

(57) ABSTRACT

Methods and apparatus for wireless communication in an IEEE 802.11 wireless communication system including legacy and high-efficiency wireless (HEW) devices are provided. In one aspect, a method for wireless communication in an IEEE 802.11 wireless communication system including legacy and high-efficiency wireless (HEW) devices includes determining a first time interval for communication according to a HEW protocol. The method further includes transmitting, according to a legacy protocol, a first communication at least partially protecting reception of communications during the first time interval. Another method includes receiving a first communication announcing a second communication. The method further includes determining a first time interval for communication according to a HEW protocol. The method further includes trans-
(Continued)

mitting, according to a legacy protocol, the second communication for at least partially protecting reception of communications during the first time interval.

24 Claims, 9 Drawing Sheets

(51) Int. Cl.
    *H04L 29/08*     (2006.01)
    *H04W 84/12*     (2009.01)
    *H04L 12/801*     (2013.01)

(52) U.S. Cl.
    CPC ......... *H04W 74/0816* (2013.01); *H04L 47/14* (2013.01); *H04W 84/12* (2013.01)

(56) References Cited

U.S. PATENT DOCUMENTS

| | | |
|---|---|---|
| 2005/0129036 A1 | 6/2005 | Sawabe |
| 2005/0143081 A1 | 6/2005 | Stephens |
| 2006/0140172 A1 | 6/2006 | Trainin |
| 2007/0127428 A1* | 6/2007 | Lee .......................... H04W 8/26 370/338 |
| 2007/0171858 A1* | 7/2007 | Grandhi .............. H04W 74/002 370/328 |
| 2008/0112351 A1 | 5/2008 | Surineni et al. |
| 2010/0046488 A1 | 2/2010 | Wentink |
| 2011/0059762 A1 | 3/2011 | Jones, IV et al. |
| 2011/0205920 A1 | 8/2011 | Ohnishi et al. |
| 2012/0163181 A1 | 6/2012 | Xue et al. |
| 2015/0117365 A1 | 4/2015 | Merlin et al. |
| 2015/0124712 A1* | 5/2015 | Doppler ................ H04W 74/04 370/329 |
| 2016/0262184 A1 | 9/2016 | Wentink |

OTHER PUBLICATIONS

International Search Report and Written Opinion—PCT/US2014/065267—ISA/EPO—Feb. 17, 2015.

* cited by examiner

SYSTEMS AND METHODS FOR IMPROVED COMMUNICATION EFFICIENCY IN HIGH EFFICIENCY WIRELESS NETWORKS

CROSS REFERENCE TO RELATED APPLICATIONS

This application claims priority under 35 U.S.C. §119(e) to U.S. Provisional Patent Application No. 61/904,374 entitled "SYSTEMS AND METHODS FOR IMPROVED COMMUNICATION EFFICIENCY IN HIGH EFFICIENCY WIRELESS NETWORKS," filed on Nov. 14, 2013, the disclosure of which is hereby incorporated by reference in its entirety. This application is related to U.S. patent application Ser. No. 14/534,020, entitled "SYSTEMS AND METHODS FOR PROTECTING LOW-RATE COMMUNICATIONS IN HIGH-EFFICIENCY WIRELESS NETWORKS," filed on Nov. 5, 2014, the disclosure of which is hereby incorporated by reference in its entirety

FIELD

Certain aspects of the present disclosure generally relate to wireless communications, and more particularly, to methods and apparatus for protecting reception of communications in wireless networks.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network can transmit/receive information between each other. The devices can communicate at different data rates. Where many devices share a communication network and there are large differences between the communication rates of the devices network, congestion and inefficient link usage can result. As such, systems, methods, and non-transitory computer-readable media are needed for improving communication efficiency in high efficiency wireless networks.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method of wireless communication in an IEEE 802.11 wireless communication system including legacy and high-efficiency wireless (HEW) devices. The method includes determining a first time interval for communication according to a HEW protocol. The method further includes transmitting, according to a legacy protocol, a first communication at least partially protecting reception of communications during the first time interval.

In various embodiments, the method can further include waiting for a second time interval before retransmitting the first communication. In various embodiments, the second time interval can include a contention window inter-frame space (CIFS). In various embodiments, the method can further include transmitting a second communication, according to the legacy protocol, during the first time interval.

In various embodiments, the method can further include transmitting a second communication announcing the first communication. The method can further include waiting for a second time interval, after transmitting the second communication, before transmitting the first communication. In various embodiments, the second time interval can be shorter than a short inter-frame space (SIFS).

In various embodiments, the method can further include at least partially synchronizing a clock with at least one other wireless device. The method can further include waiting for a synchronized transmission time before transmitting the first communication.

In various embodiments, the second communication can include a clear to send message including a specific medium access control (MAC) address identifiable by the HEW devices as instructing not to update an associated network allocation vector according to a duration field in the clear to send message, the address not being identifiable by the legacy devices such that the legacy devices are instructed to update an associated network allocation vector according to the duration field.

Another aspect provides another method of wireless communication in an IEEE 802.11 wireless communication system including legacy and high-efficiency wireless (HEW) devices. The method includes receiving a first communication announcing a second communication. The method further includes determining a first time interval for communication according to a HEW protocol. The method further includes transmitting, according to a legacy protocol, the second communication for at least partially protecting reception of communications during the first time interval.

In various embodiments, the method can further include waiting for a second time interval before retransmitting the second communication. In various embodiments, the second time interval can include a contention window inter-frame space (CIFS). In various embodiments, the method can further include transmitting a third communication, according to the legacy protocol, during the first time interval.

In various embodiments, the method can further include waiting for a second time interval, after receipt of the first communication, before transmitting the second communication. In various embodiments, the method can further include wherein the second time interval can be shorter than a short inter-frame space (SIFS).

In various embodiments, the second communication can include a clear to send message including a specific medium access control (MAC) address identifiable by the HEW devices as instructing not to update an associated network allocation vector according to a duration field in the clear to send message, the address not being identifiable by the legacy devices such that the legacy devices are instructed to update an associated network allocation vector according to the duration field.

Another aspect provides an apparatus configured to communicate in an IEEE 802.11 wireless communication system including legacy and high-efficiency wireless (HEW) devices. The apparatus includes a processor configured to determine a first time interval for communication according to a HEW protocol. The apparatus further includes a transmitter configured to transmit, according to a legacy protocol, a first communication at least partially protecting reception of communications during the first time interval.

In various embodiments, the processor can be further configured to wait for a second time interval before causing the transmitter to retransmit the first communication. In various embodiments, the second time interval can include a contention window inter-frame space (CIFS). In various embodiments, the transmitter can be further configured to transmit a second communication, according to the legacy protocol, during the first time interval.

In various embodiments, the transmitter can be further configured to transmit a second communication announcing the first communication. The transmitter can be further configured to wait for a second time interval, after transmitting the second communication, before transmitting the first communication. In various embodiments, the second time interval can be shorter than a short inter-frame space (SIFS).

In various embodiments, the processor can be further configured to at least partially synchronize a clock with at least one other wireless device. The processor can be further configured to wait for a synchronized transmission time before causing the transmitter to transmit the first communication.

In various embodiments, the second communication can include a clear to send message including a specific medium access control (MAC) address identifiable by the HEW devices as instructing not to update an associated network allocation vector according to a duration field in the clear to send message, the address not being identifiable by the legacy devices such that the legacy devices are instructed to update an associated network allocation vector according to the duration field.

Another aspect provides an apparatus configured to communicate in an IEEE 802.11 wireless communication system including legacy and high-efficiency wireless (HEW) devices. The apparatus includes a receiver configured to receive a first communication announcing a second communication. The apparatus further includes a processor configured to determine a first time interval for communication according to a HEW protocol. The apparatus further includes a transmitter configured to transmit, according to a legacy protocol, the second communication for at least partially protecting reception of communications during the first time interval.

In various embodiments, the processor can be further configured to wait for a second time interval before causing the transmitter to retransmit the second communication. In various embodiments, the second time interval can include a contention window inter-frame space (CIFS). In various embodiments, the transmitter can be further configured to transmit a third communication, according to the legacy protocol, during the first time interval.

In various embodiments, the transmitter can be further configured to wait for a second time interval, after receipt of the first communication, before transmitting the second communication. In various embodiments, the second time interval can be shorter than a short inter-frame space (SIFS).

In various embodiments, the second communication can include a clear to send message including a specific medium access control (MAC) address identifiable by the HEW devices as instructing not to update an associated network allocation vector according to a duration field in the clear to send message, the address not being identifiable by the legacy devices such that the legacy devices are instructed to update an associated network allocation vector according to the duration field.

Another aspect provides another apparatus for wireless communication in an IEEE 802.11 wireless communication system including legacy and high-efficiency wireless (HEW) devices. The apparatus includes means for determining a first time interval for communication according to a HEW protocol. The apparatus further includes means for transmitting, according to a legacy protocol, a first communication at least partially protecting reception of communications during the first time interval.

In various embodiments, the apparatus can further include means for waiting for a second time interval before retransmitting the first communication. In various embodiments, the second time interval can include a contention window inter-frame space (CIFS). In various embodiments, the apparatus can further include means for transmitting a second communication, according to the legacy protocol, during the first time interval.

In various embodiments, the apparatus can further include means for transmitting a second communication announcing the first communication. The apparatus can further include means for waiting for a second time interval, after transmitting the second communication, before transmitting the first communication. In various embodiments, the second time interval can be shorter than a short inter-frame space (SIFS).

In various embodiments, the apparatus can further include means for at least partially synchronizing a clock with at least one other wireless device. The apparatus can further include means for waiting for a synchronized transmission time before transmitting the first communication.

In various embodiments, the second communication can include a clear to send message including a specific medium access control (MAC) address identifiable by the HEW devices as instructing not to update an associated network allocation vector according to a duration field in the clear to send message, the address not being identifiable by the legacy devices such that the legacy devices are instructed to update an associated network allocation vector according to the duration field.

Another aspect provides another apparatus for wireless communication in an IEEE 802.11 wireless communication system including legacy and high-efficiency wireless (HEW) devices. The apparatus includes means for receiving a first communication announcing a second communication. The apparatus further includes means for determining a first time interval for communication according to a HEW protocol. The apparatus further includes means for transmitting, according to a legacy protocol, the second communication for at least partially protecting reception of communications during the first time interval.

In various embodiments, the apparatus can further include means for waiting for a second time interval before retransmitting the second communication. In various embodiments, the second time interval can include a contention window inter-frame space (CIFS). In various embodiments, the apparatus can further include means for transmitting a third communication, according to the legacy protocol, during the first time interval.

In various embodiments, the apparatus can further include means for waiting for a second time interval, after receipt of the first communication, before transmitting the second communication. In various embodiments, the second time interval can be shorter than a short inter-frame space (SIFS).

In various embodiments, the second communication can include a clear to send message including a specific medium access control (MAC) address identifiable by the HEW devices as instructing not to update an associated network allocation vector according to a duration field in the clear to send message, the address not being identifiable by the legacy devices such that the legacy devices are instructed to update an associated network allocation vector according to the duration field.

Another aspect provides a non-transitory computer-readable medium. The medium includes code that, when executed, causes an apparatus to determine a first time interval for communication according to a HEW protocol. The medium further includes code that, when executed, causes the apparatus to transmit, according to a legacy protocol, a first communication at least partially protecting reception of communications during the first time interval.

In various embodiments, the medium can further include code that, when executed, causes the apparatus to wait for a second time interval before retransmitting the first communication. In various embodiments, the second time interval can include a contention window inter-frame space (CIFS). In various embodiments, the medium can further include code that, when executed, causes the apparatus to transmit a second communication, according to the legacy protocol, during the first time interval.

In various embodiments, the medium can further include code that, when executed, causes the apparatus to transmit a second communication announcing the first communication. The medium can further include code that, when executed, causes the apparatus to wait for a second time interval, after transmit the second communication, before transmitting the first communication. In various embodiments, the second time interval can be shorter than a short inter-frame space (SIFS).

In various embodiments, the medium can further include code that, when executed, causes the apparatus to at least partially synchronize a clock with at least one other wireless device. The medium can further include code that, when executed, causes the apparatus to wait for a synchronized transmission time before transmitting the first communication.

In various embodiments, the second communication can include a clear to send message including a specific medium access control (MAC) address identifiable by the HEW devices as instructing not to update an associated network allocation vector according to a duration field in the clear to send message, the address not being identifiable by the legacy devices such that the legacy devices are instructed to update an associated network allocation vector according to the duration field.

In various embodiments, a non-transitory computer-readable medium. The medium includes code that, when executed, causes an apparatus to receive a first communication announcing a second communication in an IEEE 802.11 wireless communication system including legacy and high-efficiency wireless (HEW) devices. The medium further includes code that, when executed, causes the apparatus to determine a first time interval for communication according to a HEW protocol. The medium further includes code that, when executed, causes the apparatus to transmit, according to a legacy protocol, the second communication for at least partially protecting reception of communications during the first time interval.

In various embodiments, the medium can further include code that, when executed, causes the apparatus to wait for a second time interval before retransmitting the second communication. In various embodiments, the second time interval can include a contention window inter-frame space (CIFS). In various embodiments, the medium can further include code that, when executed, causes the apparatus to transmit a third communication, according to the legacy protocol, during the first time interval.

In various embodiments, the medium can further include code that, when executed, causes the apparatus to wait for a second time interval, after receipt of the first communication, before transmitting the second communication. In various embodiments, the second time interval can be shorter than a short inter-frame space (SIFS).

In various embodiments, the second communication can include a clear to send message including a specific medium access control (MAC) address identifiable by the HEW devices as instructing not to update an associated network allocation vector according to a duration field in the clear to send message, the address not being identifiable by the legacy devices such that the legacy devices are instructed to update an associated network allocation vector according to the duration field.

DETAILED DESCRIPTION

Figure 1:
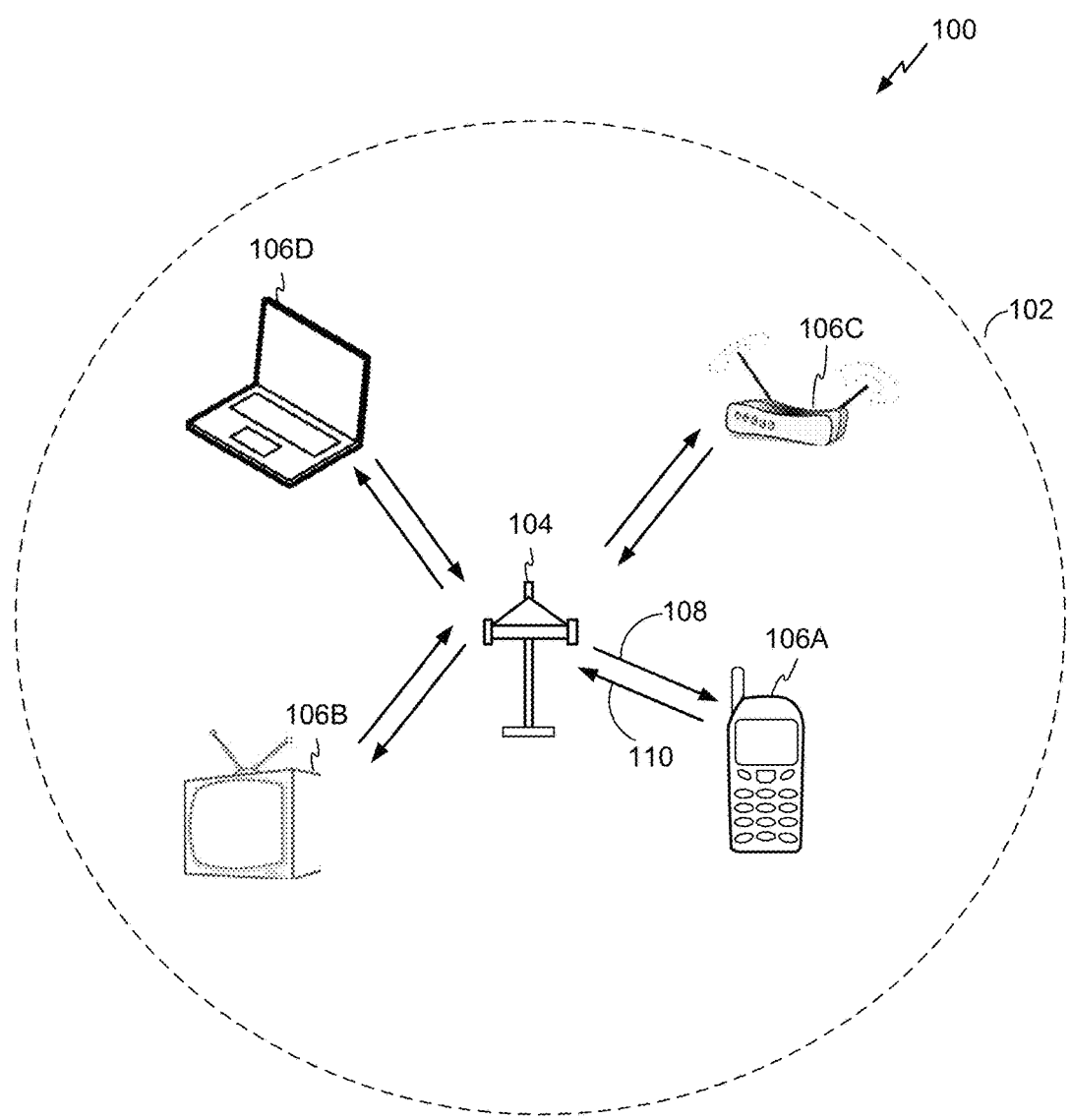
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the IEEE 802.11 family of wireless protocols.

In some aspects, wireless signals can be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol can be used for Internet access, sensors, metering, smart grid networks, or other wireless applications. Advantageously, aspects of certain devices implementing this particular wireless protocol can consume less power than devices implementing other wireless protocols, can be used to transmit wireless signals across short distances, and/or can be able to transmit signals less likely to be blocked by objects, such as humans.

In some implementations, a WLAN includes various devices which are the components that access the wireless network. For example, there can be two types of devices: access points ("APs") and clients (also referred to as stations, or "STAs"). In general, an AP serves as a hub or base station for the WLAN and an STA serves as a user of the WLAN. For example, a STA can be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA can also be used as an AP.

The techniques described herein can be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system can utilize sufficiently different directions to concurrently transmit data belonging to multiple user terminals. A TDMA system can allow multiple user terminals to share the same frequency channel by dividing the transmission signal into different time slots, each time slot being assigned to different user terminal. A TDMA system can implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers can also be called tones, bins, etc. With OFDM, each sub-carrier can be independently modulated with data. An OFDM system can implement IEEE 802.11 or some other standards known in the art. An SC-FDMA system can utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system can implement 3GPP-LTE (3rd Generation Partnership Project Long Term Evolution) or other standards.

The teachings herein can be incorporated into (e.g., implemented within or performed by) a variety of wired or wireless apparatuses (e.g., nodes). In some aspects, a wireless node implemented in accordance with the teachings herein can include an access point or an access terminal.

An access point ("AP") can include, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") can also include, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein can implement the 802.11ah standard, for example. Such devices, whether used as an STA or AP or other device, can be used for smart metering or in a smart grid network. Such devices can provide sensor applications or be used in home automation. The devices can instead or in addition be used in a healthcare context, for example for personal healthcare. They can also be used for surveillance, to enable extended-range Internet connectivity (e.g., for use with hotspots), or to implement machine-to-machine communications.

FIG. 1 illustrates an example of a wireless communication system 100 in which aspects of the present disclosure can be employed. The wireless communication system 100 can operate pursuant to a wireless standard, for example at least one of the 802.11ah, 802.11ac, 802.11n, 802.11g and 802.11b standards. The wireless communication system 100 can include an AP 104, which communicates with one or more of STA 106A, 106B, 106C, and/or 106D (collectively referred to as STAs 106 or STAs 106A-106D).

A variety of processes and methods can be used for transmissions in the wireless communication system 100 between the AP 104 and the STAs 106. For example, signals can be transmitted and received between the AP 104 and the STAs 106 in accordance with OFDM/OFDMA techniques. If this is the case, the wireless communication system 100 can be referred to as an OFDM/OFDMA system. Alternatively, signals can be transmitted and received between the AP 104 and the STAs 106 in accordance with CDMA techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106.

Figure 2:
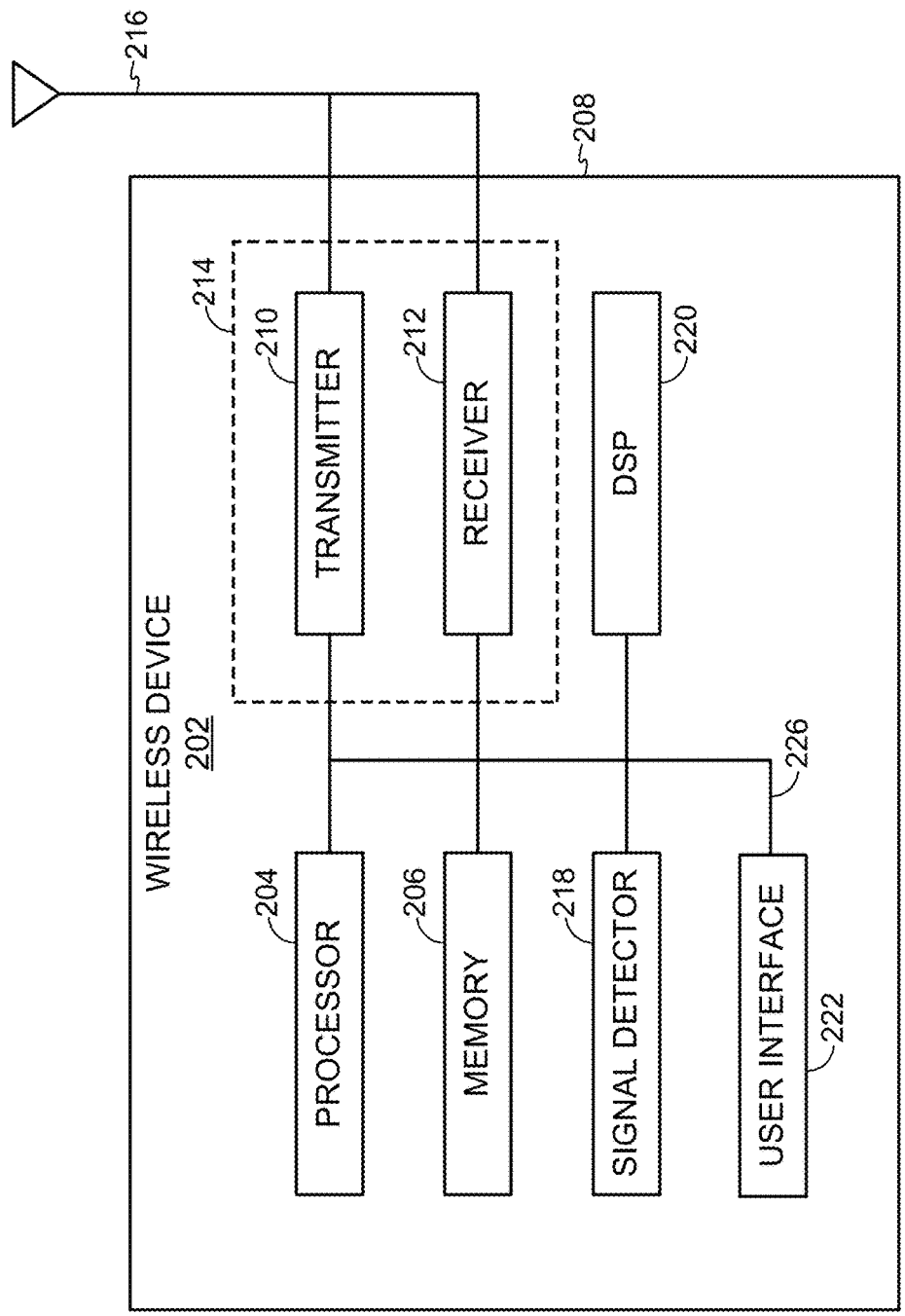
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can include the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during MIMO communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can include a physical layer data unit (PPDU). In some aspects, the PPDU is referred to as a packet.

The wireless device 202 can further include a user interface 222 in some aspects. The user interface 222 can include a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can include an AP 104 or a STA 106, and can be used to transmit and/or receive communications. The communications exchanged between devices in a wireless network can include data units which can include packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

A number of different methods, devices, and/or algorithms for configuring one or more transmissions to a legacy device (e.g., a non-HEW device) and/or a HEW device have been disclosed, that each or in a combination, and in practice and implementation would allow for management of wireless interference in the 802.11 communication system such that both legacy devices and HEW devices are able to receive communication and coexist in proximity with each other.

Dedicated Clear-to-Send Frames

Certain aspects of the present disclosure support allowing APs 104 to schedule STA 106 transmissions in optimized ways to improve efficiency. Both high efficiency wireless (HEW) stations, stations utilizing an 802.11 high efficiency protocol, and stations using older or legacy 802.11 protocols, can compete for access to a wireless medium. The high-efficiency 802.11 protocol described herein can allow for devices to operate under a modified mechanism that differentiates between HEW devices that can identify a specific MAC address embedded in an 802.11 frame and selectively ignore an associated duration field embedded in the 802.11 frame, and legacy devices that cannot. For example, with respect to FIG. 1, STAs 106A and 106B can be legacy STAs, while STAs 106C and 106D can be HEW STAs. In this embodiment, it can be desirable to silence the legacy STAs 106A and 106B so that the HEW STAs 160c and 106D can communicate with the AP 104 without interference from the legacy STAs 106A and 106B. One such implementation can utilize a clear to send (CTS) frame including a specific MAC address in the address field. The HEW STAs can be capable of identifying the specific MAC address as instructing the HEW STAs to operate in accordance with one or more implementations described below. In various embodiments, such CTS frames can be referred to as "dedicated" CTS (DCTS) frames. In such an implementation, with respect to FIG. 1, the STAs 106A and 106B can be operating in a mode according to a legacy IEEE 802.11 standard (i.e., IEEE 802.11b) and STAs 106C and 106D can be operating in a mode according to a IEEE 802.11 high efficiency protocol.

Figure 3:
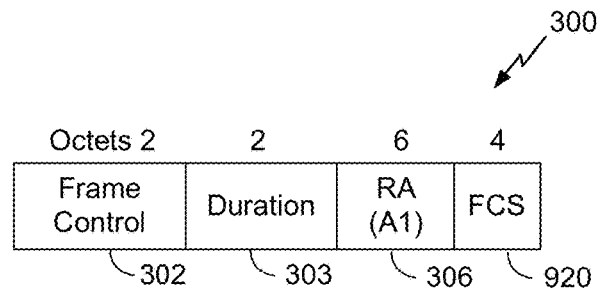
FIG. 3 illustrates an example of a clear to send (CTS) frame.

FIG. 3 illustrates an example of a clear to send (CTS) frame. The CTS frame 300 can be transmitted by a device to reserve a channel for communication. The CTS frame 300 includes 4 different fields: a frame control (FC) field 302, a duration field 304, a receiver address (RA) field 306 (also referred to as a receiver address (a1)), and a frame check sequence (FCS) field 308. FIG. 3 further indicates the size in octets of each of the fields 302, 304, 306 and 308 as 2, 2, 6 and 4, respectively. The RA field 306 includes a full MAC address of a device, which is a 48-bit (6 octet) value. For a CTS frame the MAC address in the RA field 306 would typically correspond to the device the CTS frame is intended to be received by. Under conventional operation, all devices to which the CTS frame 300 is not addressed and that are able to decode the CTS frame 300, will silence themselves for the duration indicated in the duration field 304 by updating their network allocation vector (NAV) according to the value in the duration field 304.

However, according to some implementations, the RA field 306 can include a specific MAC address that the HEW STAs, for example STAs 106C and 106D shown in FIG. 1, are specifically configured to identify as instructing the HEW STAs not to update their respective network allocation vectors (NAVs) according to a value in the duration field 304. Thus, the HEW STAs will not be silenced by receiving the CTS frame 300. However, because the legacy STAs 106A and 106B are not configured to identify the specific MAC address in the RA field 306, the legacy STAs will be instructed, by receiving the CTS frame 300, to update their NAVs according to the value in the duration field 304. This is because the specific MAC address in the RA field 306 does not match the MAC address associated with any of the legacy STAs. The duration field of the CTS frame 300 can be set such that a predetermined percentage of a total communication time is reserved for the STAs 106C and 106D to communicate. In this way, access to the wireless medium can be reserved for communication by the HEW STAs. As such, during the time the NAVs for the legacy STAs are set to silence the legacy STAs, the HEW STAs can enter a special contention period for access to the medium using a different access scheme or a different set of channel access rules than those governing the operation of the legacy STAs. Accordingly, the specific MAC address has the characteristic that it is associated with a protocol function rather than with a physical device. Such protocol functions or meanings associated with the specific MAC address can be defined by a standards body. The specific MAC addresses are thus not assigned to physical devices, but reserved for use in standards defined by the standards body, to indicate specific meaning to a frame that appears to be a normal frame for legacy devices. The specific MAC addresses are individual addresses or group addresses. When the specific MAC addresses are individual addresses, they are guaranteed to be unique, because individual MAC addresses are administered by a single authority (the Institute of Electrics and Electronics Engineers Standards Association (IEEE-SA)). When the specific MAC addresses are group addresses, they may not be guaranteed to be unique, because group addresses are at not administered by a single authority, but they are free to use by any device. In an alternative, a wireless device transmitting the CTS frame 300 including the specific MAC address can assign a specific meaning to the specific MAC address by communicating, beforehand, the meaning and the address to the associated wireless devices in a management frame exchange or via the beacon. Furthermore, some implementations can contemplate different specific MAC addresses, each assigned to a different one of the different access schemes. In this way, the specific MAC address can be utilized to demarcate the start of a special contention period for the HEW STAs.

Figure 4:
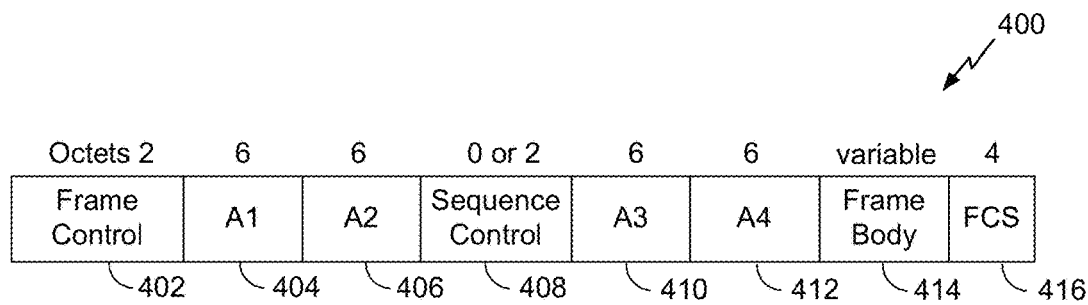
FIG. 4 illustrates an example of a MAC header frame.

In some aspects, the AP 104 or one of the STAs 106 can transmit a frame where the specific MAC address is located in one or more other address fields within the MAC header of the frame, as shown in more detail in connection with FIG. 4 below. FIG. 4 illustrates an example of a MAC header frame. The MAC header frame 400 can be transmitted by a device to reserve a channel for communication. The MAC header frame 400 can include 8 fields: a frame control (FC) field 402, a receiver address A1 field 404, a receiver address A2 field 406, a sequence control field 408, a receiver address A3 field 410, a receiver address A4 field 412, a frame body field 414, and a frame check sequence (FCS) field 416. FIG. 4 further indicates the potential size in octets of each of the fields 402, 404, 406, 408, 410, 412, 414 and 416 as 2, 6, 6, 0 or 2, 6, 6, variable, and 4, respectively. The receiver address A1 field 404 is typically utilized for indicating the MAC address of the receiving device for the frame 400. The receiver address A2 field 406 is typically utilized for indicating the MAC address of the transmitting device of the frame 400. The receiver address A3 field 410 is typically utilized for indicating the MAC address of the source device or destination device for the frame 400. The receiver address A4 field 412 is typically utilized for indicating the MAC address of the source device or destination device of the frame 400 on a bridge link.

Similar to the implementations described in connection with FIG. 3 above, the specific MAC address can be included in any of the receiver address A1 field 404, the receiver address A2 field 406, the receiver address A3 field 410, and the receiver address A4 field. As previously described, the HEW STAs, for example STAs 106C and 106D shown in FIG. 1, are specifically configured to identify the specific MAC address in any of the above-mentioned receiver address fields as instructing the HEW STAs not to update their respective network allocation vectors (NAVs) according to a value in a duration field. Thus, the HEW STAs will not be silenced. However, because the legacy STAs, for example the STAs 106A and 106B, are not configured to identify the specific MAC address, the legacy STAs will instead be instructed to update their NAVs according to the value in the duration field. In this way, access to the wireless medium can be reserved for communication by the HEW STAs.

Figure 5:
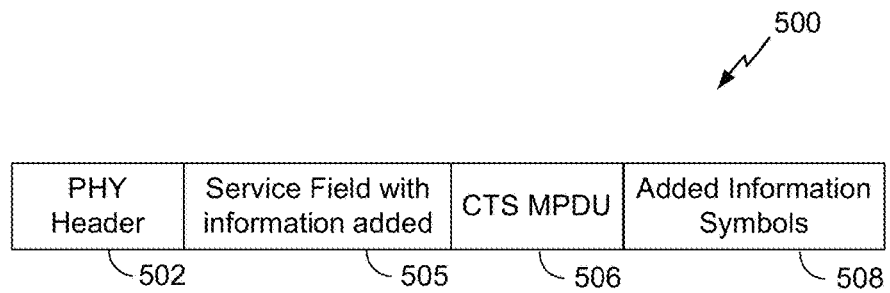
FIG. 5 illustrates an example of a CTS frame indicating information added to one or more fields.

In some implementations, the specific MAC address can additionally be utilized to indicate that additional information is present in the frame, as described in more detail in connection with FIG. 5 below. FIG. 5 illustrates an example of a CTS frame indicating information added to one or more fields. For example, the CTS frame 500 can include a PHY header 502, a service field 505, a CTS MAC service data unit (MPDU) 506 and, optionally, a field 508. In one implementation, the inclusion of the specific MAC address in an address field of the CTS MDPU 506 can indicate to the HEW STAs 106C and 106D of FIG. 1, that additional information is present in the CTS frame 500. For example, the additional information can be present in the service field 505. In addition, or in the alternative, the additional information can be present in field 508, after the CTS MPDU 506, in the form of one or more data symbols.

Figure 6:
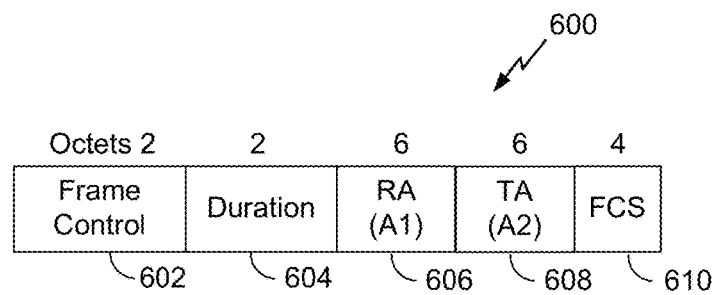
FIG. 6 illustrates an example of a request to send (RTS) frame.

Similar to its use in CTS frames, the specific MAC address can additionally be included in a request to send (RTS) frame, as described in more detail in connection with FIG. 6 below. FIG. 6 illustrates an example of a request to send (RTS) frame. The RTS frame 600 includes 5 different fields: a frame control (FC) field 602, a duration field 604, a receiver address (RA) field 606 (also referred to as a receiver address (a1)), a transmitter address (TA) field 608 (also referred to as a receiver address (a2)), and a frame check sequence (FCS) field 610. FIG. 6 further indicates the size in octets of each of the fields 602, 604, 606, 608 and 610 as 2, 2, 6, 6 and 4, respectively. Both of the RA field 606 and the TA field 608 include a full MAC address of a device, which is a 48-bit (6 octet) value. For an RTS frame, the MAC address in the RA field 606 would typically correspond to the device receiving the RTS frame 600, while the TA field 608 would typically correspond to the device transmitting the RTS frame 600. In some implementations, the specific MAC address can also be included in the TA field (a2 field) 608. In such a case, the RTS frame 600 appears to have been transmitted by a device with the specific MAC address. The RA field 608 can be set to a unicast address of the receiving STA. In an RTS/CTS exchange, the RA (a1) address of the CTS is copied from the TA (a2) address of the RTS frame 600, which implies that the specific MAC address will be copied into the CTS frame when it was present in the TA (a2) field 608 of the RTS frame 600. The presence of the specific MAC address in the TA (a2) field 608 of the RTS frame 600 can indicate a special meaning of the RTS frame 600 for the HEW STAs 106C and 106D, while the legacy STAs 106A and 106B will parse the RTS frame 600 as a regular RTS frame. Thus, both the RTS and the CTS in the RTS/CTS exchange will be interpreted according to the special meaning by HEW STAs that received the RTS and/or the CTS, because the specific address was present in both the RTS and the CTS, while legacy STAs will update their NAV according to the value in the duration field of the received RTS and/or CTS, because the legacy STAs do not recognize the specific address. The general rule is that a receiver that recognizes a specific MAC address in any one of the address fields present in a received frame parses the frame according to the rules specified for the specific MAC address (by the standard or by a peer device).

In some implementations, it can be desirable to define new control frames which carry information not present in legacy control frames, yet the new control frames are still processed by legacy wireless devices as legacy control frames would be. One such solution can include associating both a first MAC address and a second MAC address to a particular wireless device. When a frame including the first MAC address is received by the particular wireless device, the particular wireless device can process the frame according to a first standard, for example the 802.11b standard. However, when a frame including the second MAC address is received by the particular wireless device, the particular wireless device can process the frame according to a second standard, for example, 802.11ac. In such a case, the frame including the second MAC address can be parsed differently than the frame including the first MAC address. In one implementation, the first MAC address can be the address provided for address resolution purposes, for example when the address is requested for using the Address Resolution Protocol (ARP). In such an implementation, the first MAC address can be used as the source address (SA) on any transmission. In another implementation, the first MAC address can be utilized for data frames, while the second MAC address is utilized for control frames. The second MAC address can be communicated explicitly in a management frame, for example, as an information element within the management frame.

In some implementations, such a second MAC address can be derived from the first MAC address through a predefined rule. For example, the second MAC address can be formed by setting the Individual/Group (I/G) address bit of the first MAC address to 1, so that the second MAC address is the group address version of the first MAC address. In another implementation, the second MAC address can be formed by setting the Universally/Locally (U/L) Administered address bit of the first MAC address to 1, so that the second MAC address is the locally administered version of the first MAC address. In yet another implementation, the second MAC address can be formed by setting both the I/G bit and the U/L bit of the first MAC address to 1, so that the second MAC address is the locally administered group address version of the first MAC address. In yet another implementation, the second MAC address can be formed by flipping the least significant address bit of the first MAC address, thus indicating that the particular wireless device has two globally administered MAC addresses. In yet another implementation, the second MAC address can be formed by flipping a predetermined bit of the first MAC address. For example, the least significant address bit, or some other predetermined address bit, of the second MAC address can be set to 1, with the convention that the first MAC address always has the least significant bit, or the other predetermined address bit, set to 0. Alternatively, the second MAC address can be formed by setting the least significant address bit, or some other predetermined address bit, to 0, with the convention that the first MAC address always has the least significant bit, or the other predetermined address bit, set to 1.

Figure 7:
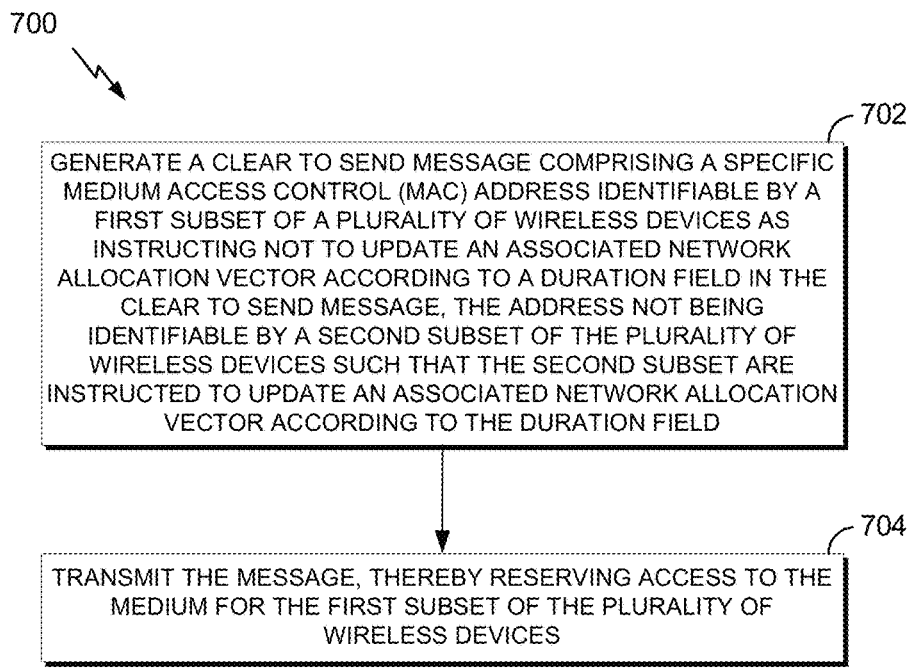
FIG. 7 is a flow chart of an aspect of an exemplary method for providing wireless communication.

FIG. 7 is a flow chart of an exemplary method 700 for wireless communication in an IEEE 802.11 wireless communication system including legacy and high-efficiency wireless (HEW) devices in accordance with certain embodiments described herein. The messages can be transmitted by the AP 104 to one or more of the STAs 106A-106D shown in FIG. 1. In addition, the wireless device 202 shown in FIG. 2 can represent a more detailed view of the AP 104, as described above. Thus, in one implementation, one or more of the steps in flowchart 700 can be performed by, or in connection with, a processor and/or transmitter, such as the processor 204 and transmitter 210 of FIG. 2, although those having ordinary skill in the art will appreciate that other components can be used to implement one or more of the steps described herein. Although blocks can be described as occurring in a certain order, the blocks can be reordered, blocks can be omitted, and/or additional blocks can be added.

In operation block 702, the AP 104 or a STA 106 can generate a clear to send (CTS) message including a specific medium access control (MAC) address identifiable by the HEW devices as instructing not to update an associated network allocation vector (NAV) according to a duration field in the clear to send message. The address is not identifiable by the legacy devices such that the legacy devices are instructed to update an associated network allocation vector according to the duration field. For example, with respect to FIG. 1, the AP 104 can generate a CTS message including a specific MAC address such that at least the STAs 106C and 106D can identify the specific MAC address as instructing the STAs 106C and 106D not to update an associated NAV according to a duration field in the CTS message. Because the specific MAC address is not identifiable by at least the STAs 106A and 106B as it is by the STAs 106C and 106D, the STAs 106A and 106B will be conventionally instructed to update their associated NAVs according to the duration field in the CTS message. In such an implementation, once the CTS message is transmitted by the AP 104 and received by the STAs 106, at least the STAs 106A and 106B can be silenced for the duration of the CTS message, thus reserving access to the medium for at least the STAs 106C and 106D.

In operation block 704, the AP 104 or a STA 106 can transmit the message, thereby partially protecting reception of communications. For example, as described above, because the STAs 106C and 106D are instructed to not update their NAVs the STAs 106C and 106D will not be silenced, while the STAs 106A and 106B, being legacy devices, will update their NAVs and be silent for the duration of the CTS message, thus reserving access to the medium for at least the STAs 106C and 106D.

Figure 8:
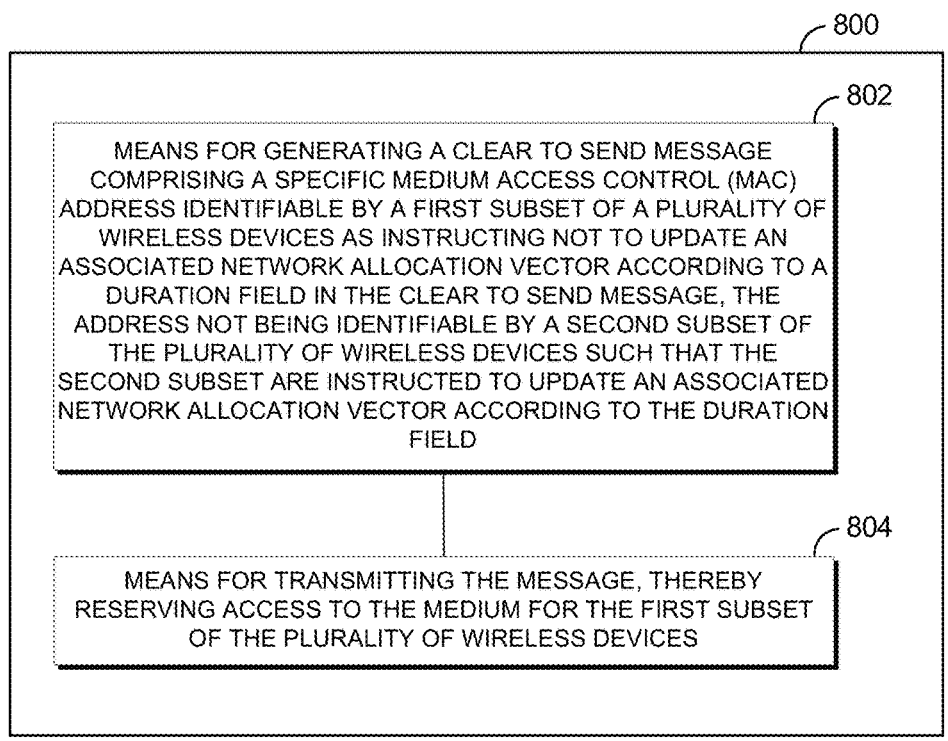
FIG. 8 is a functional block diagram of an exemplary device that can be employed within a wireless communication system.

FIG. 8 is a simplified block diagram of several sample aspects of an apparatus for wireless communication in an IEEE 802.11 wireless communication system including legacy and high-efficiency wireless (HEW) devices, in accordance with one implementation. Those skilled in the art will appreciate that the apparatus can have more components than illustrated in FIG. 8. The apparatus 800 includes only those components useful for describing some prominent features of implementations within the scope of the claims. In one implementation, the apparatus 800 is configured to perform the method 700 shown above in FIG. 7. The apparatus 800 can include the AP 104 shown in FIG. 1, which can be shown in more detail as the wireless device 202 shown in FIG. 2.

The apparatus 800 includes means 802 for configuring transmission of a clear to send message including a specific medium access control (MAC) address identifiable by the HEW devices as instructing not to update an associated network allocation vector according to a duration field in the clear to send message, the address not being identifiable by the legacy devices such that the legacy devices are instructed to update an associated network allocation vector according to the duration field. In some implementations, the means 802 can be configured to perform one or more of the functions described above with respect to block 702 of FIG. 7. The means 802 can include at least the processor 204 shown in FIG. 2, for example.

The apparatus 800 can further include means 804 for transmitting the message, thereby partially protecting reception of communications. In some implementations, the means 804 can be configured to perform one or more of the functions described above with respect to block 704 of FIG. 7. The means 804 can include at least the transmitter 210 shown in FIG. 2, for example.

Dedicated Protocol Interval Protection Using Dedicated CTS Frames

Referring back to FIG. 1, in various embodiments, the AP 104 and/or the STAs 106A-106D can be configured to define a dedicated protocol interval (DPI), during which only specific communications or types of communication are allowed. In various embodiments, for example, the DPI can include an interval during which no legacy transmissions are allowed. The DPI can be communicated in a DPI announcement (DPIA) frame, which can indicate one or more of: a start time of the DPI, an end time of the DPI, a length of the DPI, a periodicity of the DPI, an identification that the frame is a DPI announcement frame, a protocol indication, etc. In various embodiments, the DPI announcement can be transmitted according to the protocol of the DPI or another protocol (e.g., can be a HEW transmission including bandwidth and/or encoding not compatible with one or more legacy devices). In various embodiments, however, one or more potentially interfering STAs may not decode the DPI announcement, for example because the STA is out of range or because the STA is a legacy STA without the capability to decode the DPI announcement. Accordingly, it can be desirable to protect to protect at least a portion of the DPI from interfering transmission. In various embodiments described herein, the dedicated CTS discussed above can be used to at least partially protect the DPI. In particular, STAs receiving the DPI announcement can transmit the dedicated CTS indicating a NAV at least partially overlapping the DPI. While DPI protection is discussed herein with respect to the dedicated CTS described above, a person having ordinary skill in the art will appreciate that other communications for wireless medium reservation can be used.

Figure 9:
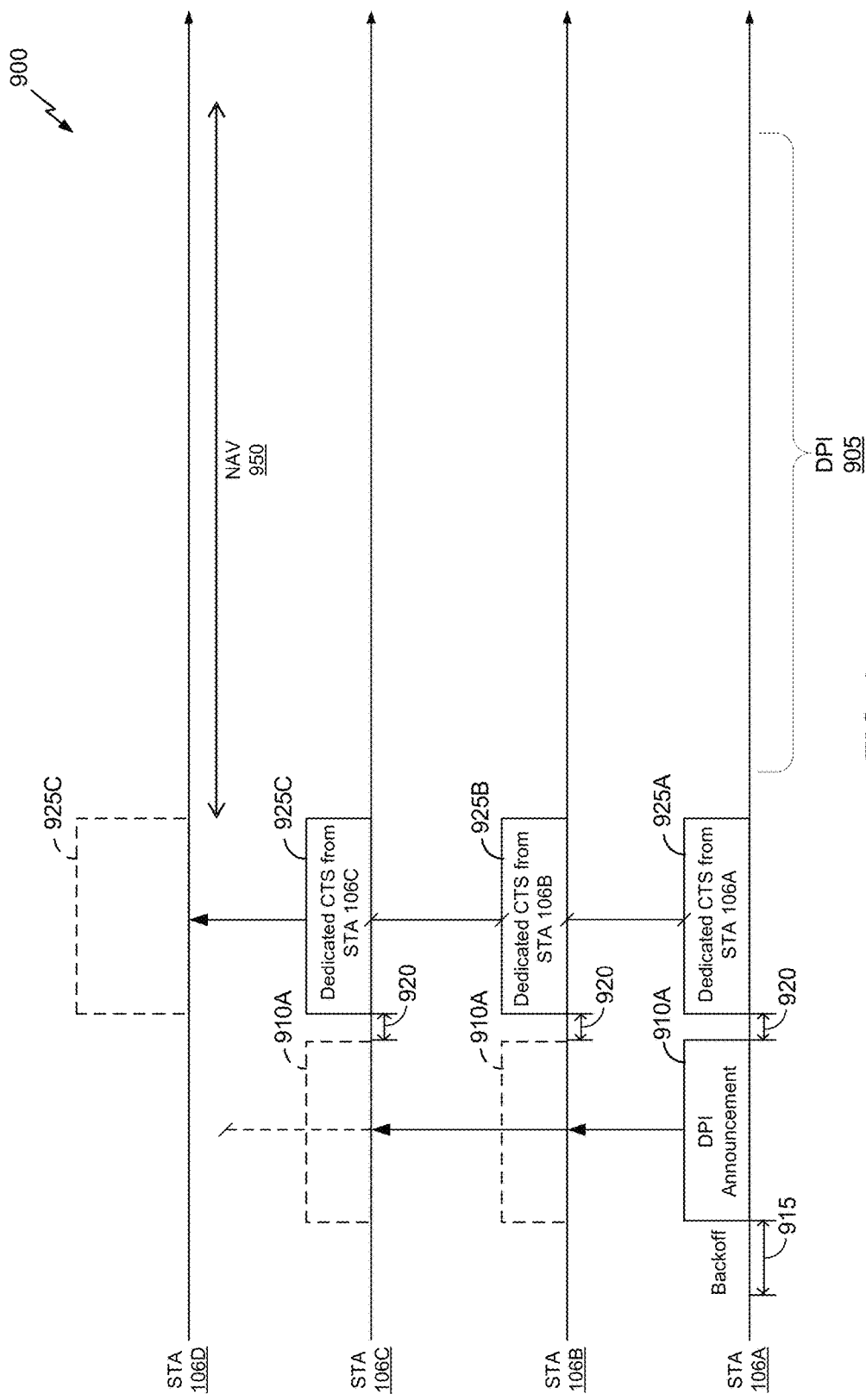
FIG. 9 is a timing diagram showing various communications in the wireless communication system of FIG. 1, according to an embodiment.

FIG. 9 is a timing diagram 900 showing various communications in the wireless communication system 100 of FIG. 1, according to an embodiment. As shown in the timing diagram 900, communications between HEW STAs 106A-106D progress sequentially from left to right. Each communication is shown as a line originating from a transmitter (indicated with a box) and being received by a receiver (indicated with an arrowhead). Communications that are not received are shown with a diagonal line through the communication. Although the timing diagram 900 refers to the device configuration shown in FIG. 1, other configurations are possible including omission of various devices shown or addition of other devices. For example, in various embodiments, the HEW STA 106D can be replaced with a legacy STA. Moreover, although the timing diagram 900 is described herein with reference to a particular order, in various embodiments, communications shown herein can be performed in a different order, or omitted, and additional communications can be added. For example, in various embodiments, one or more control frames can be added or omitted including acknowledgement (ACK) frames and/or end frames.

As shown in FIG. 9, the STA 106A determines a DPI 905. For example, the STA 106A can have data for transmission during the DPI 905. In various embodiments, such data can include a HEW protocol not detectable by legacy STAs. In some embodiments, the STA 106A can reserve the entire DPI 905 for its own transmissions. In other embodiments, the STA 106A can contend with other STAs during the DPI 905.

The STA 106A can generate a DPI announcement 910A. In an embodiment, the STA 106A contends for the wireless medium via a backoff mechanism 915 before transmitting the DPI announcement 910A. As shown in FIG. 9, the STAs 106B and 106C receive the DPI announcement 910A, whereas the STA 106D does not. In some embodiments, the STA 106D does not receive the DPI announcement 910A because it is out of range or receives an interfering signal. In some embodiments, the STA 106D does not receive the DPI announcement 910A because it is a legacy STA and not configured to decode or interpret the DPI announcement. In some embodiments, the STA 106D does not receive the DPI announcement 910A because it is transmitting during transmission of the DPI announcement 910A.

The STAs 106B and 106C can determine the DPI 905 based on the DPI announcement 910A. Each STA 106A-106C can wait a predetermined or dynamically determined amount of time 920 after the end of the DPI announcement 910A before transmitting a dedicated CTS 925A-925C indicating a NAV 950. Although the dedicated CTSs 925A-925C can be separately transmitted, they can be identical (for example, including the same predefined receiver or destination address, which can indicate to certain non-legacy devices that the NAV should not be set). Because the dedicated CTSs 925A-925C can be identical, they can be transmitted in parallel and still be decodable at devices that receive two or more dedicated CTSs 925A-925C at the same time. Such simultaneous receptions will appear to be reflections at the receiver, which commonly occurs in current wireless transmissions. In various embodiments, the time 920 can include a distributed CTS inter-frame space (DCIFS), which in various embodiments can be as short as possible. For example, the DCIFS can be shorter than a short inter-frame space (SIFS). In other embodiments, the time 920 can be another inter-frame space or can be omitted. In some embodiments, the predefined receiver or destination address can be associated with the DPI. In other embodiments, multiple predefined receiver or destination addresses can be associated with the DPI and the DPI can include an index that defines which of the multiple predefined receiver or destination addresses is to be used in the dedicated CTS.

As shown in FIG. 9, the STA 106D receives the dedicated CTS 925C from the STA 106C. In various embodiments, the STA 106D can decode the dedicated CTS 925C because the STA 106D is in range of the STA 106C. In various embodiments, the STA 106D can decode the dedicated CTS 925C because the dedicated CTS 925C includes a legacy frame. In various embodiments, the STA 106D can decode the dedicated CTS 925C because the STA 106D is not transmitting during transmission of the dedicated CTS 925C. In various embodiments, the STA 106D can receive a plurality of the dedicated CTSs 925A-925C, but can interpret them as a single dedicated CTS (or reflections thereof).

Referring still to FIG. 9, the STA 106D sets the NAV 950 based on the dedicated CTS 925C. In various embodiments, the NAV 950 can include the duration of the DPI 905. For example, the NAV 950 can start and end at the same time as the DPI 905. In some embodiments, the NAV 950 can be longer then the DPI 905. In some embodiments, the NAV 950 can only partially overlap with the DPI 905. In various embodiments, the STAs 106A-106C can be in range of the dedicated CTSs 925A-925C, but may not decode the dedicated CTSs 925A-925C during concurrent transmission.

In some embodiments, the STA 106D may not set the NAV 950 as described herein. For example, the STA 106D can be a HEW STA capable of communicating during the DPI 905. In some embodiments, the NAV 950 can indicate the DPI 905. Accordingly, the STA 106D can contend for transmission during the DPI 905. In various embodiments where the STA 106D participates during the DPI 905, the STA 106D can transmit its own dedicated CTS setting the NAV 950 prior to participating.

The STAs 106A-106C, after transmitting the dedicated CTSs 925A-925C, can participate in the DPI 905 according to the DPI announcement 910A. In some embodiments, for example, the STAs 106A-106C can contend for transmission during the DPI 905. In other embodiments, the DPI announcement 910A can reserve the DPI 905 for the STA 106A and the STAs 106B and 106C can refrain from transmitting during the DPI 905. In various other embodiments, the DPI announcement 910A can define the DPI 905 for one or more particular transmissions, transmitting devices, and/or classes or types of transmissions.

As shown in FIG. 9, the STA 106D receives the dedicated CTS 925C from the STA 106C. In some embodiments, however, the STA 106D may not receive the dedicated CTS 925C. In some embodiments, the STA 106D does not receive the dedicated CTS 925C because of another interfering transmission during transmission of the dedicated CTS 925C. In some embodiments, the STA 106D does not receive the dedicated CTS 925C because it is transmitting during transmission of the dedicated CTS 925C, as shown below in FIG. 10.

Figure 10:
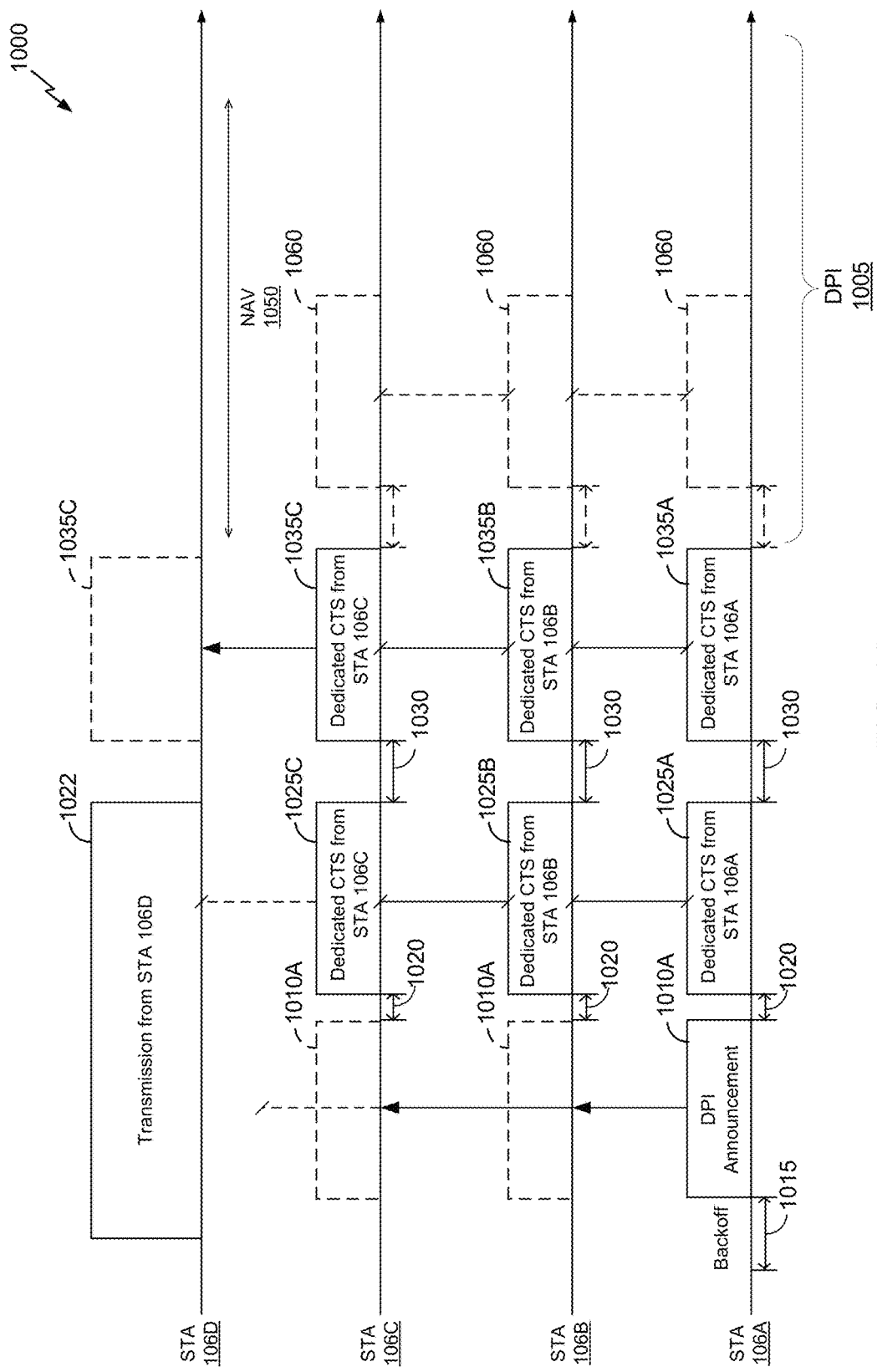
FIG. 10 is another timing diagram showing various communications in the wireless communication system of FIG. 1, according to an embodiment.

FIG. 10 is another timing diagram 1000 showing various communications in the wireless communication system 100 of FIG. 1, according to an embodiment. As shown in the timing diagram 1000, communications between HEW STAs 106A-106D progress sequentially from left to right. Each communication is shown as a line originating from a transmitter (indicated with a box) and being received by a receiver (indicated with an arrowhead). Communications that are not received are shown with a diagonal line through the communication. Although the timing diagram 1000 refers to the device configuration shown in FIG. 1, other configurations are possible including omission of various devices shown or addition of other devices. For example, in various embodiments, the HEW STA 106D can be replaced with a legacy STA. Moreover, although the timing diagram 1000 is described herein with reference to a particular order, in various embodiments, communications shown herein can be performed in a different order, or omitted, and additional communications can be added. For example, in various embodiments, one or more control frames can be added or omitted including acknowledgement (ACK) frames and/or end frames.

As shown in FIG. 10, the STA 106A determines a DPI 1005. For example, the STA 106A can have data for transmission during the DPI 1005. In various embodiments, such data can include a HEW protocol not detectable by legacy STAs. In some embodiments, the STA 106A can reserve the entire DPI 1005 for its own transmissions. In other embodiments, the STA 106A can contend with other STAs during the DPI 1005.

The STA 106A can generate a DPI announcement 1010A. In an embodiment, the STA 106A contends for the wireless medium via a backoff mechanism 1015 before transmitting the DPI announcement 1010A. As shown in FIG. 10, the STAs 106B and 106C receive the DPI announcement 1010A, whereas the STA 106D does not. In the illustrated embodiment, the STA 106D does not receive the DPI announcement 1010A because it is transmitting a communication 1022 during transmission of the DPI announcement 1010A. In some embodiments, the STA 106D does not receive the DPI announcement 1010A because it is out of range or receives an interfering signal. In some embodiments, the STA 106D does not receive the DPI announcement 1010A because it is a legacy STA and not configured to decode or interpret the DPI announcement.

The STAs 106B and 106C can determine the DPI 1005 based on the DPI announcement 1010A. Each STA 106A-106C can wait a predetermined or dynamically determined amount of time 1020 after the end of the DPI announcement 1010A before transmitting a dedicated CTS 1025A-1025C indicating a NAV 1050. Although the dedicated CTSs 1025A-1025C can be separately transmitted, they can be identical (for example, including the same predefined destination address, which can indicate to certain non-legacy devices that the NAV should not be set). In various embodiments, the time 1020 can include a distributed coordination function inter-frame space (DCIFS), which in various embodiments can be as short as possible. For example, the DCIFS can be shorter than a short inter-frame space (SIFS). In other embodiments, the time 1020 can be another inter-frame space or can be omitted.

As shown, the STA 106D does not receive the dedicated CTSs 1025A-1025C because it is transmitting the communication 1022 during transmission of dedicated CTSs 1025A-1025C. In some embodiments, the STA 106D does not receive the dedicated CTSs 1025A-925C because it is out of range or receives an interfering signal. Accordingly, it can be desirable for the STAs 106A-106C to transmit one or more additional dedicated CTS, thereby increasing the chances of reaching nearby STAs and protecting the DPI 1005.

Each STA 106A-106C can wait a predetermined or dynamically determined amount of time 1030 after the end of the dedicated CTSs 1025A-1025C before transmitting an additional dedicated CTS 1035A-1035C indicating the NAV 1050. Although the dedicated CTSs 1035A-1035C can be separately transmitted, they can be identical (for example, including the same predefined destination address, which can indicate to certain non-legacy devices that the NAV should not be set). In various embodiments, the time 1030 can include a contention window inter-frame space (CIFS). In other embodiments, the time 1030 can be another inter-frame space or can be omitted.

As shown in FIG. 10, the STA 106D receives the dedicated CTS 1035C from the STA 106C. In the illustrated embodiment, the STA 106D can decode the dedicated CTS 1035C because the STA 106D is no longer transmitting the communication 1022. In various embodiments, the STA 106D can decode the dedicated CTS 1035C because the STA 106D is in range of the STA 106C. In various embodiments, the STA 106D can receive a plurality of the dedicated CTSs 1035A-1035C, but can interpret them as a single dedicated CTS (or echoes thereof).

Referring still to FIG. 10, the STA 106D sets the NAV 1050 based on the dedicated CTS 1035C. In various embodiments, the NAV 1050 can include the duration of the DPI 1005. For example, the NAV 1050 can start and end at the same time as the DPI 1005. In some embodiments, the NAV 1050 can be longer then the DPI 1005. In some embodiments, the NAV 1050 can only partially overlap with the DPI 1005. In various embodiments, the STAs 106A-106C can be in range of the dedicated CTSs 1035A-1035C, but may not decode the dedicated CTSs 1035A-1035C during concurrent transmission.

In some embodiments, the STA 106D may not set the NAV 1050 as described herein. For example, the STA 106D can be a HEW STA capable of communicating during the DPI 1005. In some embodiments, the NAV 1050 can indicate the DPI 1005. Accordingly, the STA 106D can contend for transmission during the DPI 1005. In various embodiments where the STA 106D participates during the DPI 1005, the STA 106D can transmit its own dedicated CTS setting the NAV 1050 prior to participating.

In various embodiments, the STAs 106A-106C can transmit one or more additional CTSs 1060. For example, the STAs 106A-106C can again wait a predetermined or dynamically determined amount of time after the end of the dedicated CTSs 1035A-1035C before transmitting one or more additional dedicated CTS 1060 indicating the NAV 1050. In various embodiments, the time can include a contention window inter-frame space (CIFS). In other embodiments, the time can be another inter-frame space or can be omitted.

The STAs 106A-106C, after transmitting the dedicated CTSs 1035A-1035C, can participate in the DPI 1005 according to the DPI announcement 1010A. In some embodiments, for example, the STAs 106A-106C can contend for transmission during the DPI 1005. In other embodiments, the DPI announcement 1010A can reserve the DPI 1005 for the STA 106A and the STAs 106B and 106C can refrain from transmitting during the DPI 1005. In various other embodiments, the DPI announcement 1010A can define the DPI 1005 for one or more particular transmissions, transmitting devices, and/or classes or types of transmissions.

As shown in FIGS. 9-10, the STAs 106A-106C can coordinate transmission of dedicated CTSs via a DPI announcement frame. In various embodiments, transmission of dedicated CTSs can be coordinated in other ways. For example, when the STAs 106A-106C are time synchronized, as shown below in FIG. 10, dedicated CTSs can be scheduled in advance.

Figure 11:
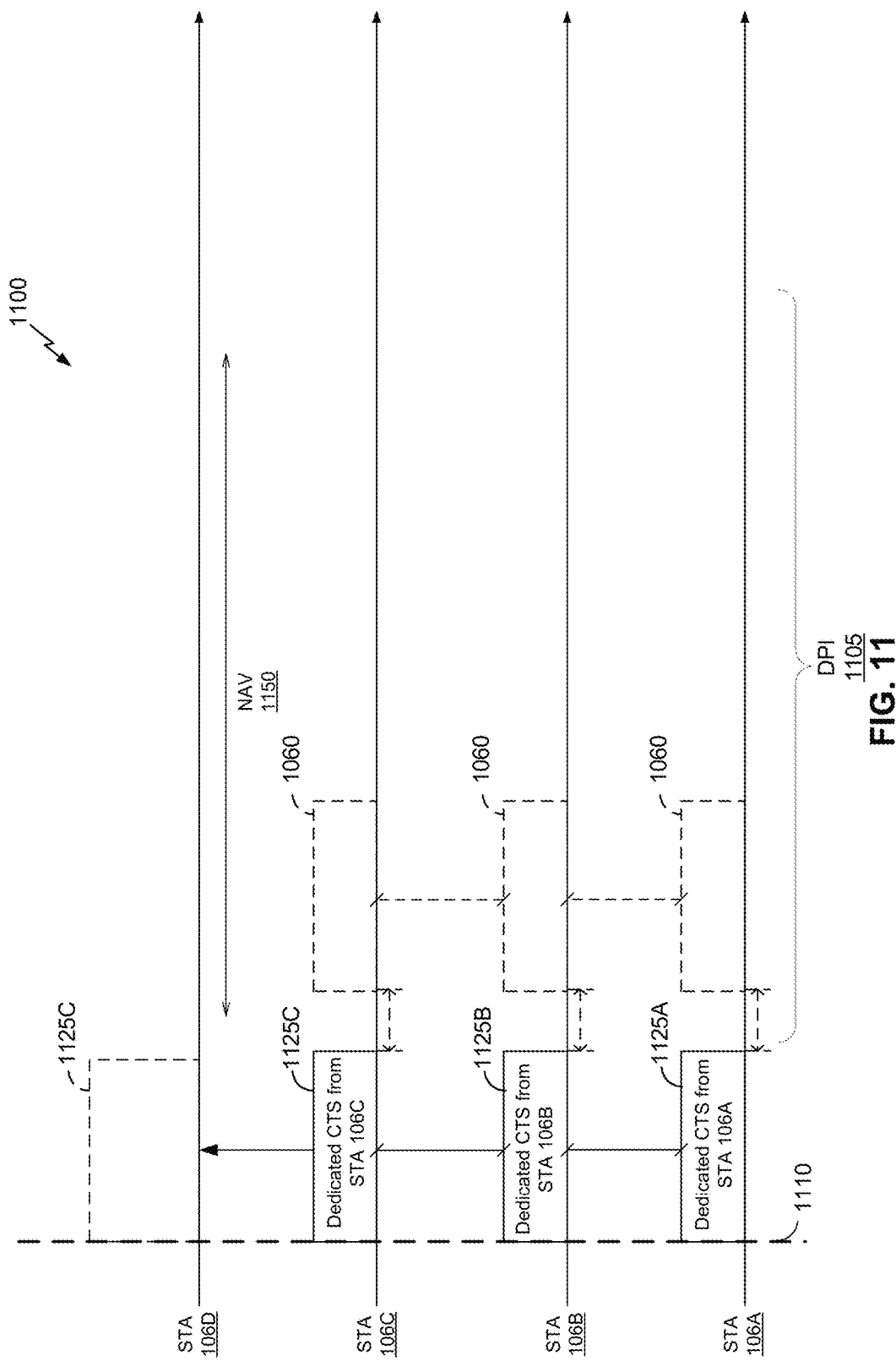
FIG. 11 is a timing diagram showing various communications in the wireless communication system of FIG. 1, according to an embodiment.

FIG. 11 is a timing diagram 1100 showing various communications in the wireless communication system 110 of FIG. 1, according to an embodiment. As shown in the timing diagram 1100, communications between time-synchronized STAs 106A-106D progress sequentially from left to right. Each communication is shown as a line originating from a transmitter (indicated with a box) and being received by a receiver (indicated with an arrowhead). Communications that are not received are shown with a diagonal line through the communication. Although the timing diagram 1100 refers to the device configuration shown in FIG. 1, other configurations are possible including omission of various devices shown or addition of other devices. For example, in various embodiments, the HEW STA 106D can be replaced with a legacy STA. Moreover, although the timing diagram 1100 is described herein with reference to a particular order, in various embodiments, communications shown herein can be performed in a different order, or omitted, and additional communications can be added. For example, in various embodiments, one or more control frames can be added or omitted including acknowledgement (ACK) frames and/or end frames.

As shown in FIG. 11, the time synchronized STAs 106A-106C can determine a DPI 1105. For example, a start time of the DPI 1105 can be pre-stored, dynamically determined, or otherwise coordinated in advance. In various embodiments, the STAs 106A-106C can contend with each other during the DPI 1105. In other embodiments, the STAs 106A-106C can coordinate usage of the DPI 1105 using transmission slots, alternating access, etc.

The STAs 106A-106C can also determine a synchronized time 1110 for transmission of dedicated CTSs 1125A-1125C indicating a NAV 1150. Although the dedicated CTSs 1125A-1125C can be separately transmitted, they can be identical (for example, including the same predefined destination address, which can indicate to certain non-legacy devices that the NAV should not be set). In various embodiments, the time 1110 can include one or more scheduled dedicated CTS transmission times.

As shown, the STA 106D does not receive the dedicated CTSs 1125A-1125C because it is transmitting the communication 1122 during transmission of dedicated CTSs 1125A-1125C. In some embodiments, the STA 106D does not receive the dedicated CTSs 1125A-925C because it is out of range or receives an interfering signal. Accordingly, it can be desirable for the STAs 106A-106C to transmit one or more additional dedicated CTS, thereby increasing the chances of reaching nearby STAs and protecting the DPI 1105.

As shown in FIG. 11, the STA 106D receives the dedicated CTS 1125C from the STA 106C. In the illustrated embodiment, the legacy STA 106D can decode the dedicated CTS 1125C because the dedicated CTS 1125C has a legacy format. In various embodiments, the STA 106D can decode the dedicated CTS 1135C because the STA 106D is in range of the STA 106C. In various embodiments, the STA 106D can receive a plurality of the dedicated CTSs 1135A-1135C, but can interpret them as a single dedicated CTS (or echoes thereof).

Referring still to FIG. 11, the STA 106D sets the NAV 1150 based on the dedicated CTS 1125C. In various embodiments, the NAV 1150 can include the duration of the DPI 1105. For example, the NAV 1150 can start and end at the same time as the DPI 1105. In some embodiments, the NAV 1150 can be longer then the DPI 1105. In some embodiments, the NAV 1150 can only partially overlap with the DPI 1105. In various embodiments, the STAs 106A-106C can be in range of the dedicated CTSs 1125A-1125C, but may not decode the dedicated CTSs 1125A-1125C during concurrent transmission.

In some embodiments, the STA 106D may not set the NAV 1150 as described herein. For example, the STA 106D can be a HEW STA capable of communicating during the DPI 1105. In some embodiments, the NAV 1150 can indicate the DPI 1105. Accordingly, the STA 106D can contend for transmission during the DPI 1105. In various embodiments where the STA 106D participates during the DPI 1105, the STA 106D can transmit its own dedicated CTS setting the NAV 1150 prior to participating.

In various embodiments, the STAs 106A-106C can transmit one or more additional CTSs 1060. For example, the STAs 106A-106C can wait a predetermined or dynamically determined amount of time after the end of the dedicated CTSs 1125A-1125C before transmitting one or more additional dedicated CTS 1060 indicating the NAV 1150. In various embodiments, the time can include a contention window inter-frame space (CIFS). In other embodiments, the time can be another inter-frame space or can be omitted.

The STAs 106A-106C, after transmitting the dedicated CTSs 1125A-1125C, can participate in the DPI 1105 according to the DPI announcement 1110A. In some embodiments, for example, the STAs 106A-106C can contend for transmission during the DPI 1105. In other embodiments, a previously transmitted DPI announcement (not shown) can reserve the DPI 1105 for the STA 106A and the STAs 106B and 106C can refrain from transmitting during the DPI 1105. In various other embodiments, the DPI announcement can define the DPI 1105 for one or more particular transmissions, transmitting devices, and/or classes or types of transmissions.

Figure 12:
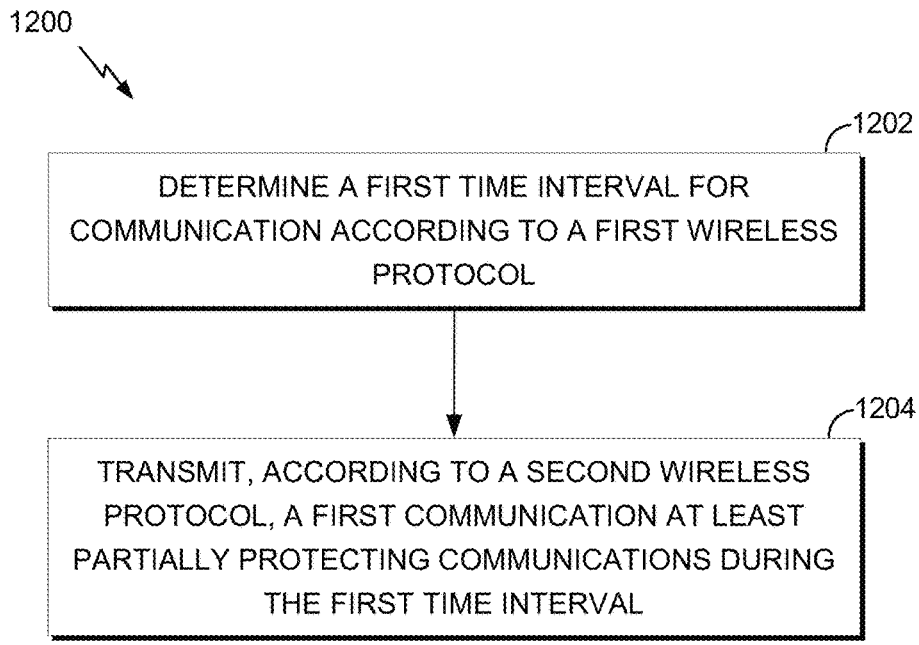
FIG. 12 is a flowchart of an exemplary method of wireless communication in an IEEE 802.11 wireless communication system including legacy and high-efficiency wireless (HEW) devices.

FIG. 12 is a flowchart 1200 of an exemplary method of wireless communication in an IEEE 802.11 wireless communication system including legacy and high-efficiency wireless (HEW) devices. Although the method of flowchart 1200 is described herein with reference to the wireless communication system 100 discussed above with respect to FIG. 1, the wireless device 202 discussed above with respect to FIG. 2, and the timelines 900, 1000, and 1100 discussed above with respect to FIGS. 9-11, respectively, a person having ordinary skill in the art will appreciate that the method of flowchart 1200 can be implemented by another device described herein, any other suitable device, or any combination of multiple devices. In an embodiment, one or more steps in flowchart 1200 can be performed by a processor or controller. Although the method of flowchart 1200 is described herein with reference to a particular order, in various embodiments, blocks herein can be performed in a different order, or omitted, and additional blocks can be added.

First, at block 1202, the wireless device 202 determines a first time interval for communication according to a HEW protocol. For example, any of the STAs 106A-106D can determine the DPI 905, 1005, and/or 1105. In various embodiments, the HEW protocol can include a HEW protocol. In various embodiments, the HEW protocol is not decodable by one or more legacy devices.

Next, at block 1204, the wireless device 202 transmits, according to a legacy protocol, a first communication at least partially protecting reception of communications during the first time interval. For example, any of the STAs 106A-106D can transmit the dedicated CTSs 925A-925C, 1025A-1025C, and/or 1025A-1025C. The dedicated CTSs 925A-925C, 1025A-1025C, and/or 1125A-1125C can indicate the NAVs 950, 1050, and/or 1150.

In various embodiments, the wireless device 202 can further be configured to wait for a second time interval before retransmitting the first communication. For example, any of the STAs 106A-106D can wait for the time interval 1030 before transmitting the dedicated CTSs 1035A-1035C, 1060, 1160. In various embodiments, the second time interval can include a contention window inter-frame space (CIFS).

In various embodiments, the wireless device 202 can be configured to transmit a second communication, according to the legacy protocol, during the first time interval. For example, any of the STAs 106A-106D can contend for transmission during the DPI 905, 1005, and/or 1105. In some embodiments, only one STA 106A can transmit during the DPI 905, 1005, and/or 1105.

In various embodiments, the wireless device 202 can be configured transmit a second communication announcing the first communication. The wireless device can wait for a second time interval, after transmitting the second communication, before transmitting the first communication. For example, the STA 106A can transmit the DPI announcement 1010A and can wait for the DCIFS 1020 before transmitting the dedicated CTS 1025A. In an embodiment, the wireless device 202 contend during a backoff period, such as the backoff period 1015, before transmitting the DPI announcement 1020. In various embodiments, the second time interval can be shorter than a short inter-frame space (SIFS).

In various embodiments, the wireless device 202 can be configured to at least partially synchronize a clock with at least one other wireless device and to wait for a synchronized transmission time before transmitting the first communication. For example, any of the STAs 106A-106D can synchronize clocks with each other, and can wait for the time 1110 before transmitting the dedicated CTSs 1125A-1125C.

In various embodiments, the second communication can include a clear to send message including a specific medium access control (MAC) address identifiable by the HEW devices as instructing not to update an associated network allocation vector according to a duration field in the clear to send message, the address not being identifiable by the legacy devices such that the legacy devices are instructed to update an associated network allocation vector according to the duration field. For example, the dedicated CTSs 925A-925C, 1025A-1025C, 1035A-1035C, 1060, 1125A-1125C, 1135A-1135C, and/or 1160 can include any of the dedicated CTSs described above with respect to FIGS. 3-8.

Figure 13:
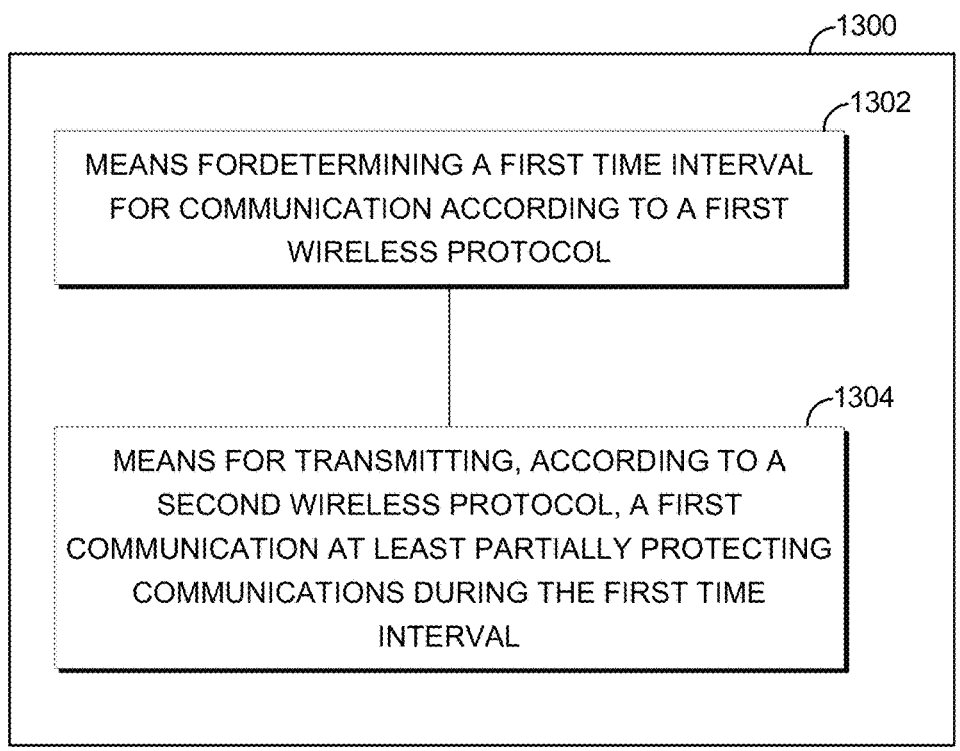
FIG. 13 is a functional block diagram of an apparatus for wireless communication in an IEEE 802.11 wireless communication system including legacy and high-efficiency wireless (HEW) devices.

FIG. 13 is a functional block diagram of an apparatus 1300 for wireless communication in an IEEE 802.11 wireless communication system including legacy and high-efficiency wireless (HEW) devices. Those skilled in the art will appreciate that an apparatus for detecting wireless communication can have more components than the simplified apparatus 1300 shown in FIG. 13. The apparatus 1300 for wireless communication in an IEEE 802.11 wireless communication system including legacy and high-efficiency wireless (HEW) devices shown includes only those components useful for describing some prominent features of implementations within the scope of the claims. The apparatus 1300 for wireless communication in an IEEE 802.11 wireless communication system including legacy and high-efficiency wireless (HEW) devices includes means 1302 for determining a first time interval for communication according to a HEW protocol, and means 1304 for transmitting, according to a legacy protocol, a first communication at least partially protecting reception of communications during the first time interval. In various embodiments, the apparatus 1300 can further include means for performing any other block or function described herein.

In an embodiment, means 1302 for determining a first time interval for communication according to a HEW protocol can be configured to perform one or more of the functions described above with respect to block 1202 (FIG. 12). In various embodiments, means 1302 for determining a first time interval for communication according to a HEW protocol can be implemented by one or more of the processor 204 (FIG. 2), the memory 206 (FIG. 2), the signal detector 218 (FIG. 2), the DSP 220 (FIG. 2), the receiver 212 (FIG. 2), the transceiver 214 (FIG. 2), and/or the antenna 216 (FIG. 2).

In an embodiment, means 1304 for transmitting, according to a legacy protocol, a first communication at least partially protecting reception of communications during the first time interval can be configured to perform one or more of the functions described above with respect to block 1204 (FIG. 12). In various embodiments, means 1304 for transmitting, according to a legacy protocol, a first communication at least partially protecting reception of communications during the first time interval can be implemented by one or more of the processor 204 (FIG. 2), the memory 206 (FIG. 2), the signal detector 218 (FIG. 2), the DSP 220 (FIG. 2), the transmitter 210 (FIG. 2), the transceiver 214 (FIG. 2), and/or the antenna 216 (FIG. 2).

Figure 14:
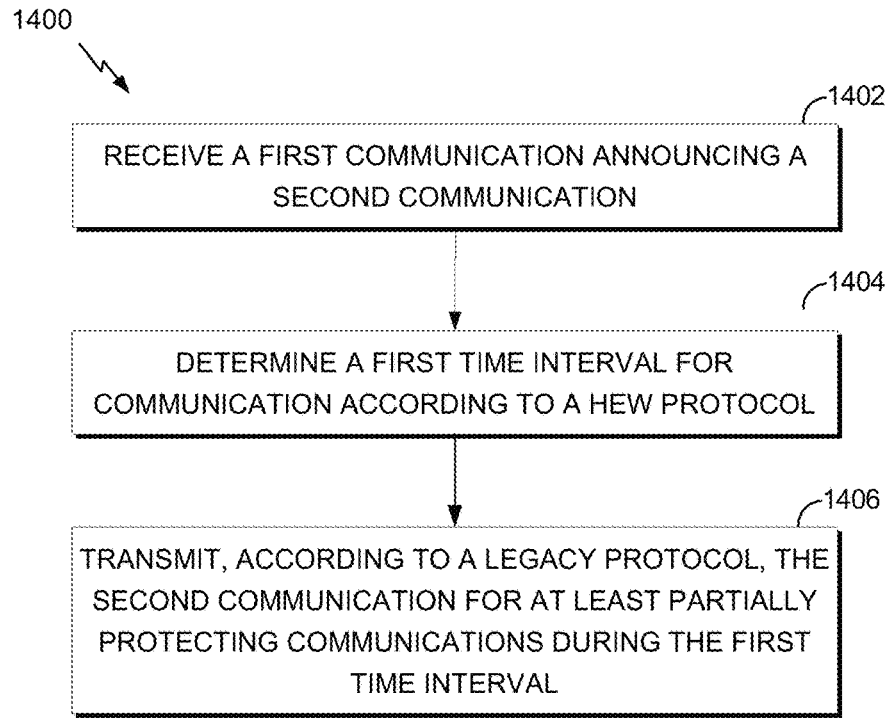
FIG. 14 is a flowchart of another exemplary method of wireless communication in an IEEE 802.11 wireless communication system including legacy and high-efficiency wireless (HEW) devices.

FIG. 14 is a flowchart 1400 of another exemplary method of wireless communication in an IEEE 802.11 wireless communication system including legacy and high-efficiency wireless (HEW) devices. Although the method of flowchart 1400 is described herein with reference to the wireless communication system 100 discussed above with respect to FIG. 1, the wireless device 202 discussed above with respect to FIG. 2, and the timelines 900, 1000, and 1100 discussed above with respect to FIGS. 9-11, respectively, a person having ordinary skill in the art will appreciate that the method of flowchart 1400 can be implemented by another device described herein, any other suitable device, or any combination of multiple devices. In an embodiment, one or more steps in flowchart 1400 can be performed by a processor or controller. Although the method of flowchart 1400 is described herein with reference to a particular order, in various embodiments, blocks herein can be performed in a different order, or omitted, and additional blocks can be added.

First, at block 1402, the wireless device 202 receives a first communication announcing a second communication. For example, the STA 106C can receive the DPI announcement 1010A. In various embodiments, the wireless device 202 can wait for a second time interval, after receiving the first communication, before transmitting the second communication. For example, the STA 106C can wait for the DCIFS 1020 before transmitting the dedicated CTS 1025A.

Next, at block 1404, the wireless device 202 determines a first time interval for communication according to a HEW protocol. For example, any of the STAs 106A-106D can determine the DPI 905, 1005, and/or 1105. In various embodiments, the HEW protocol can include a HEW protocol. In various embodiments, the HEW protocol is not decodable by one or more legacy devices.

Then, at block 1406, the wireless device 202 transmits, according to a legacy protocol, the second communication for at least partially protecting reception of communications during the first time interval. For example, any of the STAs 106A-106D can transmit the dedicated CTSs 925A-925C, 1025A-1025C, and/or 1025A-1025C. The dedicated CTSs 925A-925C, 1025A-1025C, and/or 1125A-1125C can indicate the NAVs 950, 1050, and/or 1150.

In various embodiments, the wireless device 202 can further be configured to wait for a second time interval before retransmitting the second communication. For example, any of the STAs 106A-106D can wait for the time interval 1030 before transmitting the dedicated CTSs 1035A-1035C, 1060, 1160. In various embodiments, the second time interval can include a contention window inter-frame space (CIFS).

In various embodiments, the wireless device 202 can be configured to transmit a third communication, according to the legacy protocol, during the first time interval. For example, any of the STAs 106A-106D can contend for transmission during the DPI 905, 1005, and/or 1105. In some embodiments, only one STA 106A can transmit during the DPI 905, 1005, and/or 1105.

In various embodiments, the second communication can include a clear to send message including a specific medium access control (MAC) address identifiable by the HEW devices as instructing not to update an associated network allocation vector according to a duration field in the clear to send message, the address not being identifiable by the legacy devices such that the legacy devices are instructed to update an associated network allocation vector according to the duration field. For example, the dedicated CTSs 925A-925C, 1025A-1025C, 1035A-1035C, 1060, 1125A-1125C, 1135A-1135C, and/or 1160 can include any of the dedicated CTSs described above with respect to FIGS. 3-8.

Figure 15:
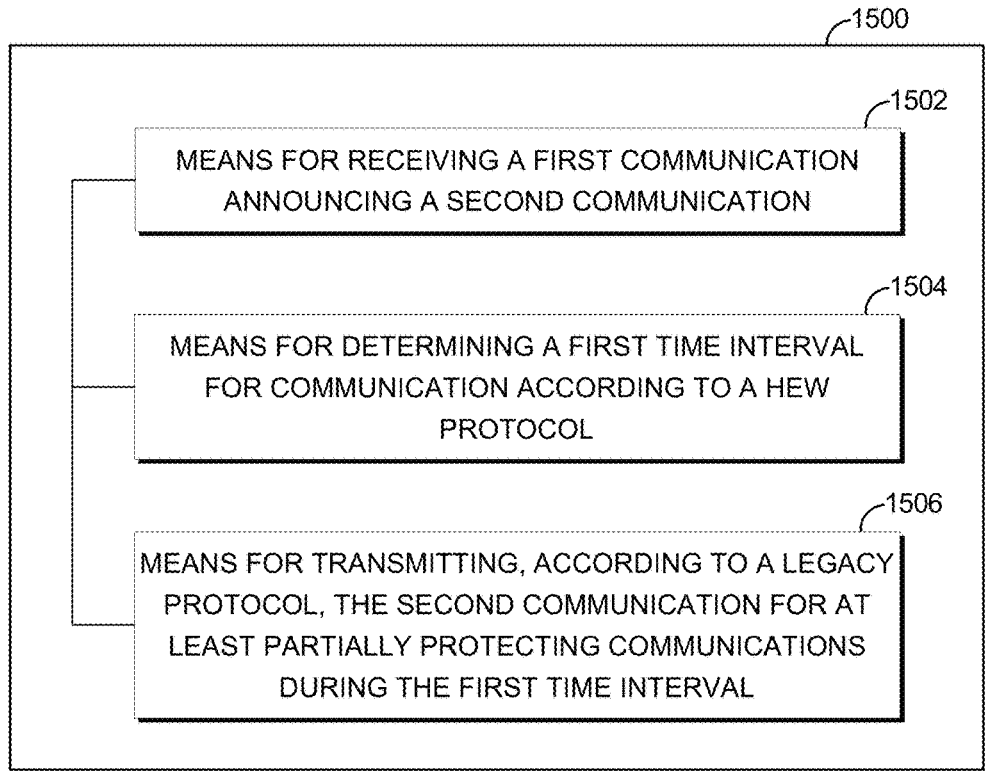
FIG. 15 is a functional block diagram of another apparatus for wireless communication in an IEEE 802.11 wireless communication system including legacy and high-efficiency wireless (HEW) devices.

FIG. 15 is a functional block diagram of another apparatus 1500 for wireless communication in an IEEE 802.11 wireless communication system including legacy and high-efficiency wireless (HEW) devices. Those skilled in the art will appreciate that an apparatus for detecting wireless communication can have more components than the simplified apparatus 1500 shown in FIG. 15. The apparatus 1500 for wireless communication in an IEEE 802.11 wireless communication system including legacy and high-efficiency wireless (HEW) devices shown includes only those components useful for describing some prominent features of implementations within the scope of the claims. The apparatus 1500 for wireless communication in an IEEE 802.11 wireless communication system including legacy and high-efficiency wireless (HEW) devices includes means 1502 for receiving a first communication announcing a second communication, means 1504 for determining a first time interval for communication according to a HEW protocol, and means 1506 for transmitting, according to a legacy protocol, the second communication for at least partially protecting reception of communications during the first time interval. In various embodiments, the apparatus 1500 can further include means for performing any other block or function described herein.

In an embodiment, means 1502 for receiving a first communication announcing a second communication can be configured to perform one or more of the functions described above with respect to block 1402 (FIG. 14). In various embodiments, means 1502 for receiving a first communication announcing a second communication can be implemented by one or more of the processor 204 (FIG. 2), the memory 206 (FIG. 2), the signal detector 218 (FIG. 2), the DSP 220 (FIG. 2), the receiver 212 (FIG. 2), the transceiver 214 (FIG. 2), and/or the antenna 216 (FIG. 2).

In an embodiment, means 1504 for determining a first time interval for communication according to a HEW protocol can be configured to perform one or more of the functions described above with respect to block 1404 (FIG. 14). In various embodiments, means 1502 for determining a first time interval for communication according to a HEW protocol can be implemented by one or more of the processor 204 (FIG. 2), the memory 206 (FIG. 2), the signal detector 218 (FIG. 2), the DSP 220 (FIG. 2), the receiver 212 (FIG. 2), the transceiver 214 (FIG. 2), and/or the antenna 216 (FIG. 2).

In an embodiment, means 1506 for transmitting, according to a legacy protocol, the second communication for at least partially protecting reception of communications during the first time interval can be configured to perform one or more of the functions described above with respect to block 1404 (FIG. 14). In various embodiments, means 1506 for transmitting, according to a legacy protocol, the second communication for at least partially protecting reception of communications during the first time interval can be implemented by one or more of the processor 204 (FIG. 2), the memory 206 (FIG. 2), the signal detector 218 (FIG. 2), the DSP 220 (FIG. 2), the transmitter 210 (FIG. 2), the transceiver 214 (FIG. 2), and/or the antenna 216 (FIG. 2).

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can include non-transitory computer readable medium (e.g., tangible media). In addition, in some aspects computer readable medium can include transitory computer readable medium (e.g., a signal). Combinations of the above should also be included within the scope of computer-readable media.

The methods disclosed herein include one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A method of wireless communication in a wireless communication system including a first device communicating via a first protocol, and a second device communicating via a second protocol, comprising:
   receiving a first communication announcing a second communication;
   determining a first time interval for communication according to the first protocol; and
   transmitting, according to the second protocol, the second communication for at least partially protecting reception of communications during the first time interval,
   wherein the second communication comprises a clear to send message comprising a specific medium access control (MAC) address identifiable by the first device as instructing not to update an associated network allocation vector according to a duration field in the clear to send message, the address not being identifiable by the second device such that the second device is instructed to update an associated network allocation vector according to the duration field.

2. The method of claim 1, further comprising waiting for a second time interval before retransmitting the second communication.

3. The method of claim 2, wherein the second time interval comprises a contention window inter-frame space (CIFS).

4. The method of claim 1, further comprising transmitting a third communication, according to the second protocol, during the first time interval.

5. The method of claim 1, further comprising waiting for a second time interval, after receipt of the first communication, before transmitting the second communication.

6. The method of claim 5, wherein the second time interval is shorter than a short inter-frame space (SIFS).

7. An apparatus configured to communicate in a wireless communication system including a first device communicating via a first protocol, and a second device communicating via a second protocol, comprising:
- a receiver configured to receive a first communication announcing a second communication;
- a processor configured to determine a first time interval for communication according to the first protocol; and
- a transmitter configured to transmit, according to the second protocol, the second communication for at least partially protecting reception of communications during the first time interval,
- wherein the second communication comprises a clear to send message comprising a specific medium access control (MAC) address identifiable by the first device as instructing not to update an associated network allocation vector according to a duration field in the clear to send message, the address not being identifiable by the second device such that the second device is instructed to update an associated network allocation vector according to the duration field.

8. The apparatus of claim 7, wherein the processor is further configured to wait for a second time interval before causing the transmitter to retransmit the second communication.

9. The apparatus of claim 8, wherein the second time interval comprises a contention window inter-frame space (CIFS).

10. The apparatus of claim 7, wherein the transmitter is further configured to transmit a third communication, according to the second protocol, during the first time interval.

11. The apparatus of claim 7, wherein the transmitter is further configured to wait for a second time interval, after receipt of the first communication, before transmitting the second communication.

12. The apparatus of claim 11, wherein the second time interval is shorter than a short inter-frame space (SIFS).

13. An apparatus for wireless communication in a wireless communication system including a first device communicating via a first protocol, and a second device communicating via a second protocol, comprising:
- means for receiving a first communication announcing a second communication;
- means for determining a first time interval for communication according to the first protocol; and
- means for transmitting, according to the second protocol, the second communication for at least partially protecting reception of communications during the first time interval,
- wherein the second communication comprises a clear to send message comprising a specific medium access control (MAC) address identifiable by the first device as instructing not to update an associated network allocation vector according to a duration field in the clear to send message, the address not being identifiable by the second device such that the second device is instructed to update an associated network allocation vector according to the duration field.

14. The apparatus of claim 13, further comprising means for waiting for a second time interval before retransmitting the second communication.

15. The apparatus of claim 14, wherein the second time interval comprises a contention window inter-frame space (CIFS).

16. The apparatus of claim 13, further comprising means for transmitting a third communication, according to the second protocol, during the first time interval.

17. The apparatus of claim 13, further comprising means for waiting for a second time interval, after receipt of the first communication, before transmitting the second communication.

18. The apparatus of claim 17, wherein the second time interval is shorter than a short inter-frame space (SIFS).

19. A non-transitory computer-readable medium comprising code that, when executed, causes an apparatus to:
- receive a first communication announcing a second communication in a wireless communication system including a first device communicating via a first protocol, and a second device communicating via a second protocol;
- determine a first time interval for communication according to the first protocol; and
- transmit, according to a legacy protocol, the second communication for at least partially protecting reception of communications during the first time interval,
- wherein the second communication comprises a clear to send message comprising a specific medium access control (MAC) address identifiable by the first device as instructing not to update an associated network allocation vector according to a duration field in the clear to send message, the address not being identifiable by the second device such that the second device is instructed to update an associated network allocation vector according to the duration field.

20. The medium of claim 19, further comprising code that, when executed, causes the apparatus to wait for a second time interval before retransmitting the second communication.

21. The medium of claim 20, wherein the second time interval comprises a contention window inter-frame space (CIFS).

22. The medium of claim 19, further comprising code that, when executed, causes the apparatus to transmit a third communication, according to the second protocol, during the first time interval.

23. The medium of claim 19, further comprising code that, when executed, causes the apparatus to wait for a second time interval, after receipt of the first communication, before transmitting the second communication.

24. The medium of claim 23, wherein the second time interval is shorter than a short inter-frame space (SIFS).

* * * * *